United States Patent
Pauling

(10) Patent No.: US 6,207,316 B1
(45) Date of Patent: Mar. 27, 2001

(54) RECHARGEABLE BATTERY SYSTEM WITH LARGE-PORED AND SMALL-PORED SEPARATOR ARRANGEMENT

(75) Inventor: Hans Juergen Pauling, Oberderdingen (DE)

(73) Assignees: Stadtwerke Karlsruhe GmbH; EnBW Regional GmbH, both of Karlsruhe (DE)

( * ) Notice: Subject to any disclaimer, the term of this patent is extended or adjusted under 35 U.S.C. 154(b) by 0 days.

(21) Appl. No.: 09/380,266

(22) PCT Filed: Feb. 25, 1998

(86) PCT No.: PCT/EP98/01072

§ 371 Date: Aug. 27, 1999

§ 102(e) Date: Aug. 27, 1999

(87) PCT Pub. No.: WO98/38686

PCT Pub. Date: Sep. 3, 1998

(30) Foreign Application Priority Data

Feb. 28, 1997 (DE) .............................................. 197 08 209

(51) Int. Cl.[7] .................................................. H01M 2/14
(52) U.S. Cl. .......................... 429/132; 429/144; 429/145; 429/229
(58) Field of Search .................................... 429/132, 145, 429/229, 144, 136

(56) References Cited

U.S. PATENT DOCUMENTS

| 3,669,746 | * | 6/1972 | Devitt et al. . |
| 3,753,784 | * | 8/1973 | Eisenacher et al. . |
| 3,892,594 | | 7/1975 | Charlesby et al. . |
| 4,292,357 | | 9/1981 | Erisman et al. . |

FOREIGN PATENT DOCUMENTS 0 091 238   10/1983   (EP) .

\* cited by examiner

*Primary Examiner*—John S. Maples
(74) *Attorney, Agent, or Firm*—Jacobson, Price, Holman & Stern, PLLC

(57) ABSTRACT

The invention relates to a rechargeable battery system with a plurality of electrodes in an electrolyte space filled with electrolyte, which can be tapped with the aid of an electrical tap. At least one of the electrodes is constructed as a substantially insoluble electrode of the second type. Said electrode also has a large-pore and small-pore separator arrangement or an electrochemically active coating provided with a surface profile, through which it is possible to reduce at least the structural and/or shape changes of the electrode during cyclic charging and discharging linked with the sinking of mechanically unstable discharge products.

22 Claims, 6 Drawing Sheets

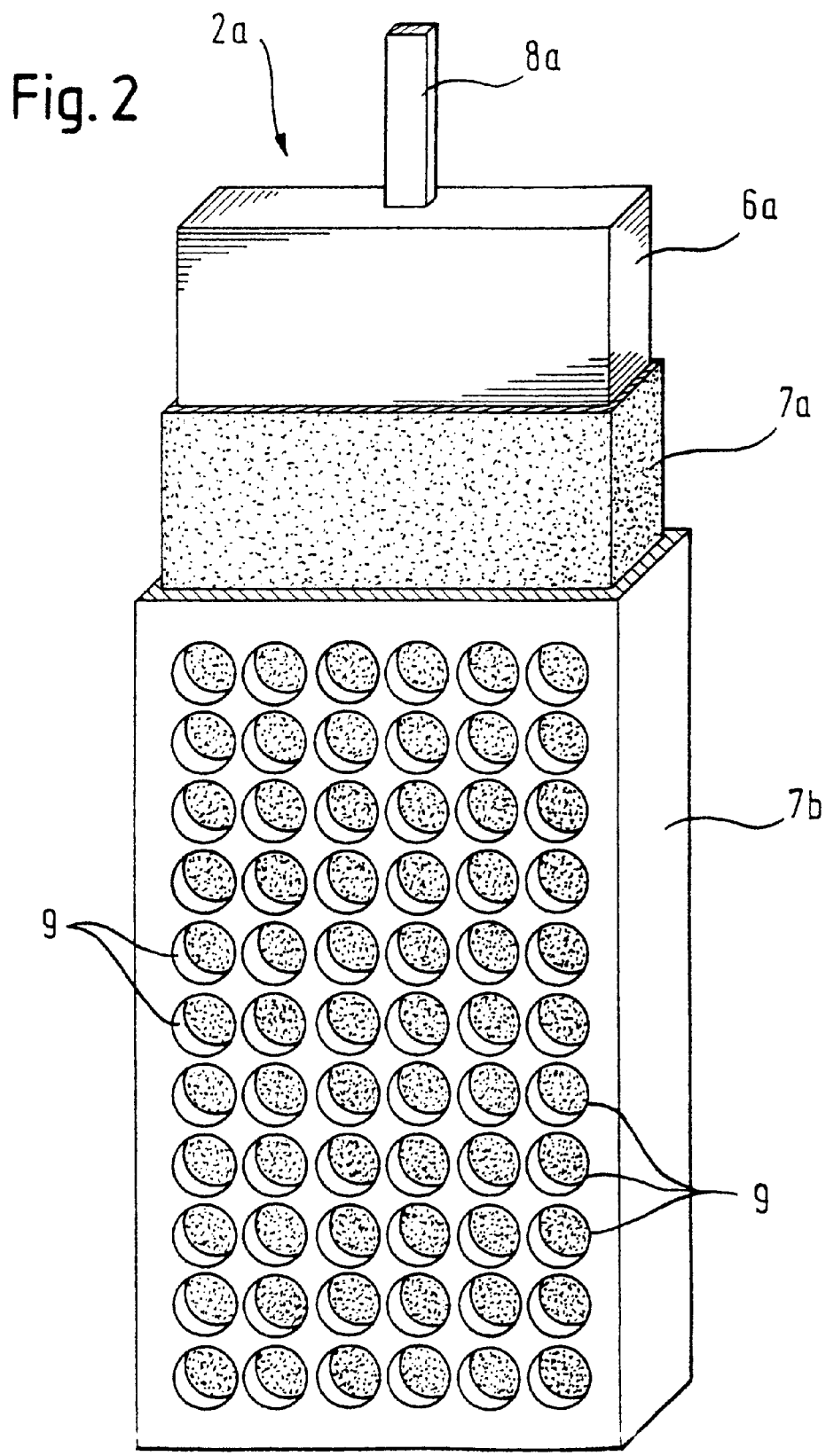

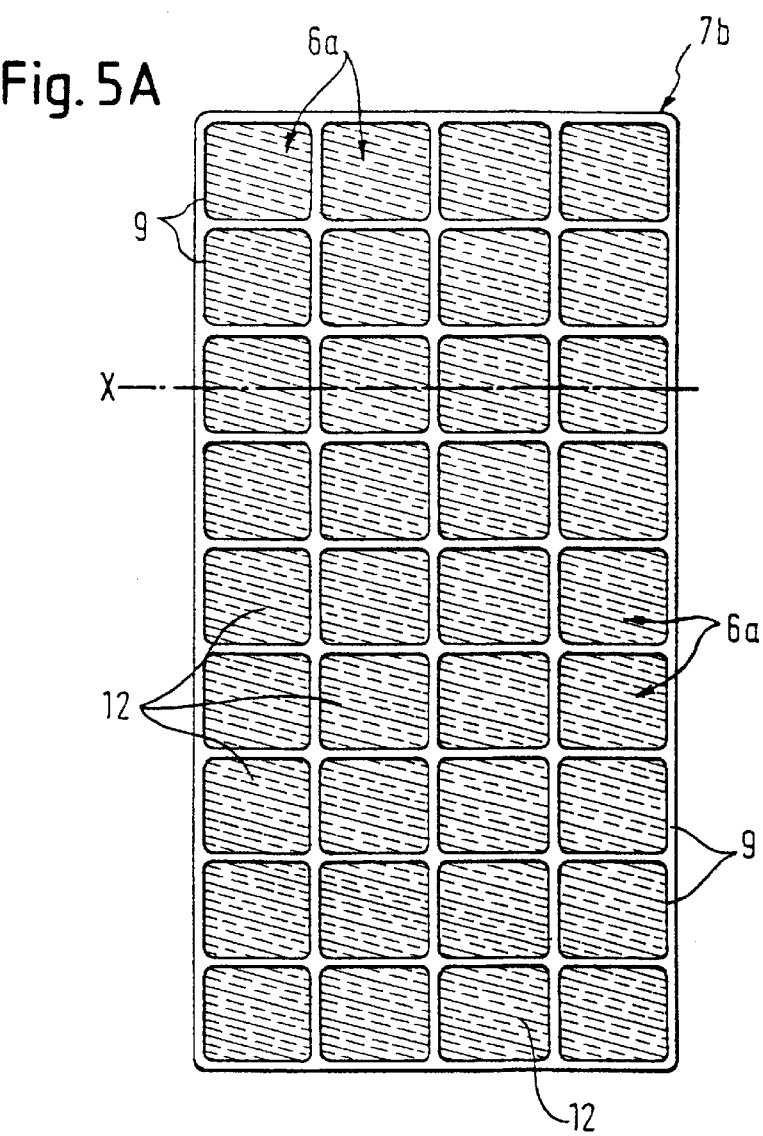
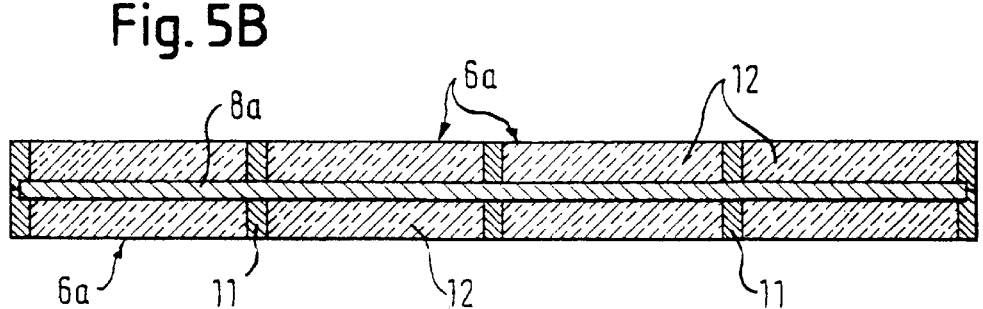

RECHARGEABLE BATTERY SYSTEM WITH LARGE-PORED AND SMALL-PORED SEPARATOR ARRANGEMENT

BACKGROUND OF THE INVENTION

1. Field of the Invention

The invention relates to a rechargeable battery system having a plurality of electrodes in an electrolyte space filled with electrolytes and tapped with the aid of an electrical tap, in which at least one of the electrodes is constructed as a substantially insoluble electrode of the second type and in which at least the substantially insoluble electrode of the second type has a separator arrangement, through which it is possible to reduce at least the structural and/or shape changes of the electrode during cyclic charging and discharging linked with the sinking of mechanically unstable discharge products; to a rechargeable battery system having a plurality of electrodes in an electrolyte space filled with electrolytes and tapped with the aid of an electrical tap, in which at least one of the electrodes is constructed as a substantially insoluble electrode of the second type and in which at least the substantially insoluble electrode of the second type has an electrochemically active coating provided with a surface profile or relief having a plurality of depressions and/or elevations, through which it is possible to reduce at least the structural and/or shape changes of the electrode during cyclic charging and discharging linked with the sinking of mechanically unstable discharge products; and to the use of one of the preceding battery systems in a rechargeable metal/air depolarized battery, and in particular in a zinc/air depolarized battery.-Page

2. Related Art

Batteries and battery systems are becoming increasingly important for primary and secondary energy supply. This increasing relevance is more particularly due to the ever increasing demands made with regards to environmental compatibility of energy supply systems in the sense of emission protection and reusability or recyclability of raw materials and energy.

This firstly relates to the end user and consequently private households and secondly public installations, particularly the infrastructure and traffic which are being equipped with more environmentally compatible energy sources. Already mobile devices, such as e.g. portable micro-devices and also vehicles, particularly road, rail or water vehicles, are being equipped with environmentally friendly, reusable or rechargeable energy supports in. the form of accumulators or batteries. Such energy supports in the form of battery systems are also being increasingly used in immobile devices, such as stand-alone devices and as emergency power supplies.

In conjunction with the private end user, as well as public installations, use is being increasingly made of metal/air depolarized batteries as rechargeable primary batteries, e.g. in hearing aids or heart pacemakers, as well as in telecommunications engineering and in signal installations.

Such metal/air depolarized batteries are more particularly suitable due to their high energy density and their cost-effective, environmentally compatible active materials as decentralized and rechargeable power sources. It is particularly appropriate to use zinc as the material for a metal electrode. This is due to the low equivalence mass and the high hydrogen overpotential of zinc, which prevents a spontaneous dissolving of the Zn electrode in an aqueous and in particular alkaline electrolyte and simultaneously permits recharging with a high current efficiency.

In the case of rechargeable accumulators or battery systems, the problem is known that during recharging structural and shape changes occur at the metal electrodes or electrochemically active coatings. This problem has also been observed in the case of zinc/air depolarized batteries. The shape change of the metal electrode with an increasing number of recharging cycles, in certain circumstances and in a secondary manner, leads to internal short-circuits of the electrode or to passivation phenomena. Thus, with an increasing number of recharging cycles the electrode capacity drops, so that the life of the battery or battery system is drastically shortened.

The prior art has evolved numerous methods in order to reduce the harmful influences of structural and shape changes to the metal electrode or electrochemically active coatings of the actual shape change.

It is e.g. known to perform the recharging of the electrodes externally and a discharged battery to virtually renew from the beginning by a mechanical replacement of the spent electrodes by new electrodes.

Admittedly this enables a discharged battery after "recharging" with a new electrode to have the original battery capacity, but a rapid, flexible electrical recharging by the customer in suit is impossible. Thus, in the prior art manufacturing and marketing organizations for such battery systems have had to simultaneously offer a service for the reprocessing of discharged electrodes.

The prior art also discloses so-called magazine systems for receiving electrode configurations with a mechanically unstable, gel-like or pulverulent electrochemically active coating, which surrounds the corresponding electrode configurations and is intended to mechanically stabilize the coating. However, this mechanical stabilization relates to the electrode material as such, if it is e.g. a gel or a powder and is intended to facilitate the handling of the electrode configuration during change and incorporation. The structural and shape change of the electrodes during recharging, however, takes place on the microscopic and mesoscopic size scale and is not prevented in the known magazine systems.

The prior art also discloses so-called small-pored separators, which are substantially in contact with the electrode and in the case of certain electrode types reduces the extent of the structural and shape change on the electrodes during recharging caused by so-called electroosmosis. This procedure is possible with substantially soluble electrodes of the first type.

In the case of the latter, as a result of such a small-pored separator, the formation of electroosmotically driven convection currents and therefore the occurence of certain concentration gradients can be reduced, so that there can also be a reduction in the structural and shape changes of the electrode configuration during cyclic recharging.

However, in all these known measures and configurations according to the prior art, a considerable proportion of the structural and shape changes of the electrode configuration during cyclic recharging is not covered, so that only a very small number of recharging cycles is left for the user of a rechargeable battery system until the latter and in particular the electrodes contained therein have to undergo a fundamental renewal, which leads to not inconsiderable costs.

SUMMARY OF THE INVENTION

The object of the invention is to provide a battery system, which makes it possible for the user in a practicable manner to cost-effectively electrically recharge the battery system.

According to the invention, the object is on the one hand solved by a rechargeable battery system having a plurality of electrodes in an electrolyte space filled with electrolytes and tapped with the aid of an electrical tap, in which at least one of the electrodes is constructed as a substantially insoluble electrode of the second type and in which at least the substantially insoluble electrode of the second type has a separator arrangement, through which it is possible to reduce at least the structural and/or shape changes of the electrode during cyclic charging and discharging linked with the sinking of mechanically unstable discharge products; and on the other by a rechargeable battery system having a plurality of electrodes in an electrolyte space filled with electrolytes and tapped with the aid of an electrical tap, in which at least one of the electrodes is constructed as a substantially insoluble electrode of the second type and in which at least the substantially insoluble electrode of the second type has an electrochemically active coating provided with a surface profile or relief having a plurality of depressions and/or elevations, through which it is possible to reduce at least the structural and/or shape changes of the electrode during cyclic charging and discharging linked with the sinking of mechanically unstable discharge products. Advantageous further developments of the rechargeable battery sysstem according to the invention form the subject matter of the subclaims. According to the invention, the preceding battery systems can be used in a rechargeable metal/air depolarized battery, and in particular in a zinc/air depolarized battery.

The rechargeable battery system according to the invention firstly has in a first form a plurality of electrodes arranged in an electrolyte space, which is filled with an electrolyte. The plurality of electrodes is tapped with the aid of an electrical tap. At least one of the electrodes is constructed as a substantially insuluble electrode of the second type. This substantially insoluble electrode of the second type has a separator arrangement, through which it is possible to reduce at least the structural and/or shape change of the electrode during cyclic charging and discharging which is linked with the sinking of unstable discharge products.

Although the prior art already uses small-pored separators, in order to reduce structural and shape changes attributable to electroosmostically driven convection currents, this procedure does not provide satisfactory results in the case of insoluble electrodes of the second type. This is inter alia due to the fact that in the case of insoluble electrodes of the second type the structural and/or shape changes, in certain circumstances, is not or is not decisively caused by concentration gradient-driven electroosmosis, but is in fact caused by gravity in connection with insoluble and particularly mechanically unstable discharge products, particularly from the electrode surface and is due to the sinking thereof.

The battery system according to the invention in a second form also has a plurality of electrodes placed in an electrolyte space, which is filled with an electrolyte, the plurality of electrodes being tapped with the aid of an electrical tap. At least one of the electrodes is constructed as a substantially insoluble electrode of the second type. For reducing the structural and/or shape changes of the electrode linked with the sinking of mechanically unstable discharge products, in this second form of the inventive battery system, at least on the substantially insoluble electrode of the second type is provided an electrochemically active coating with a surface profile or relief and having a plurality of depressions and/or elevations.

As a result of the surface profile or relief the electrochemically active coating of the electrode, i.e. the electrode surface, is subdivided by the correspondingly constructed depressions and/or elevations in the form of a type of parquetting or tiling, namely as separate segments, blocks or islands. As a result of this subdivision and for roughly constant adhesive forces, there is only an action of the local weight occurring in a segment or block via the discharge products occurring there.

Through a corresponding dimensioning of the profile or relief structure, i.e. by a corresponding size distribution of the surface segments, it is possible to achieve that the substantially insoluble, particularly mechanically unstable discharge products are not detached or only detached to a limited extent in the segments from the gravity of the discharge products summated in said segment, so that then the large-scale structural and/or shape change of the electrode can be greatly reduced. Then, at the most there can be small, local structural and/or shape changes to the electrode surface, namely at the size scale resulting from the segment size and which as a result of a corresponding dimensioning of the parquetting is not disadvantageous for the operation of the battery system with regards to a possibly high number of cycles.

The sinking of substantially insoluble and in particular mechanically unstable discharge products is prevented in the case of two rechargeable battery systems according to the invention, so that by suppressing the influence of the driving force, particularly gravity, the structural and/or shape changes of the electrodes can be effectively reduced during cyclic charging and discharging, so that a larger number of recharging cycles is possible, before the battery system and in particular the electrodes contained therein has to undergo a fundamental renewal.

An advantageous further development of the battery system of the first form consists of at least the substantially insoluble electrode of the second type, in addition to the separator arrangement, having an electrochemically active coating with a surface profile or relief with a plurality of depressions and/or elevations. As a result of this electrochemically active coating provided with a corresponding surface profile or relief, advantageously the structural and/or shape changes of the electrode during cyclic charging and discharging linked with the sinking of mechanically unstable discharge products can be further reduced.

In an advantageous further development of the battery system of the second type, it is additionally provided that at least the substantially insoluble electrode of the second type, besides the inventively constructed electrochemically active coating provided with a surface relief or profile, there is also a separator arrangement, through which it is possible to further reduce the structural and/or shape changes of the electrode during cyclic charging and discharging linked with the sinking of mechanically unstable discharge products.

It is therfore particularly advantageous, according to the first and second forms of the battery system according to the invention, to provide a combination of a separator arrangement and corresponding surface profile of the electrochemically active coating of the electrode, because then the two action mechanisms are synergistically reinforced. for suppressing the sinking of insoluble and in particular mechanically unstable discharge products. However, it is pointed out that the construction of the separator arrangement and the provision of a corresponding electrode surface with reliefs constitute independent, although combinable procedures for the solution according to the invention.

Although the suppression of sinking of insoluble and in particular mechanically unstable discharge products, as well as the reduction of shape and/or volume changes represents a general principle, the effect can be more particularly be applied to substantially insoluble electrodes of the second type and particularly metal electrodes connected as an anode during battery use or discharge and as a cathode during regeneration or recharging, preference being given to a zinc electrode due to its particularly high energy density.

A particularly advantageous separator arrangement is obtained if it is formed by at least one small-pored separator and at least one large-pored separator. As described hereinbefore, the large-pored separator serves to prevent the sinking of mechanically unstable discharge products. The small-pored separator also offers the possibility of reducing the structural and/or shape changes of the electrode linked with the gradient-driven electroosmosis, so that in all both the electroosmotically driven and also the gravity-driven structural and/or shape changes of the electrode can be reduced and with such an arrangement it is possible to achieve a further increase in the number of recharging cycles up to the next necessary fundamental renewal of the electrode configuration.

It is particularly advantageous that the small-pored separator is constructed for suppressing the escape of discharge products of the electrode, which can in particular be soluble, out of the separator arrangement. A particularly advantageous battery system is obtained if the small-pored separator is created for suppressing the formation of internal short-circuits, particularly through the formation of dendrites during the electrical recharging.

The large-pored separator is preferably constructed for the firm surrounding of the electrode, because this leads to a particularly easy handling of the enclosed electrode configuration and with respect to the electrode/separator interface little space is left for a shape and/or volume change to the electrode surface.

To further simplify the handling of the enclosed electrode, the large-pored separator advantageoulsy has an increased mechanical stability. This counteracts a volume increase and/or shape change to the electrode during discharging and/or charging of the battery system.

The small-pored separator can be constructed as the first, inner separator, which is surrounded by the large-pored separator as the second, outer separator. However, any other embodiment is conceivable.

In order to particularly effectively reduce the sinking process of the substantially insoluble and in particular mechanically unstable discharge products, a preferred, large-pored separator has a plurality of pores, openings or chambers, which can be used for the supply and/or removal of electrolytes with respect to the electrode. With respect to their cross-section, said pores, openings or chambers have substantially the same configuration. They are advantageously distributed roughly homogeneously over the entire separator or on the surface thereof, in order to ensure a uniform wetting of the electrode surface with electrolytes and consequently a particularly uniform decomposition or composition of the electrode during cyclic discharging or charging.

The distribution of the pores, openings or channels is particlarly roughly homogeneous on the separator surface in the case of a honeycomb arrangement on the separator, whilst in particular having a circular, rectangular or hexagonal cross-section.

In order to withstand the stresses in the battery system, the separator arrangement and in particular the large-pored separator are made from an electrically nonconductive material. It is advantageous for the separator arrangement to be substantially chemically inert. With respect to these extreme requirements, the separator arrangement is in particular inert relative to oxygen, concentrated lyes, particularly KOH and/or acids. There is also inertness against electrolyte additives, such as e.g. Pb, Hg, Cd, Ca, Sn and or others.

Since in the different charging and discharging processes and also under the most varied operating conditions it is possible for pronounced temperature fluctuations to occur within the battery system, the separator arrangement and in particular the large-pored separator has a chemically stable construction in the operating temperature range of in particular approximately $-60°$ C. to approximately $+70°$ C. It is also advantageous if in this operating temperature range the separator arrangement and in particular the large-pored separator has a substantially small thermal expansion coefficient, because it is then ensured that the electrode surface is given e.g. no space for a volume expansion. The operating temperature range is in general the temperature range in which the battery can be appropriately charged and discharged and which is upwardly limited by the electrolyte boiling point.

The rechargeable battery system according to the invention is preferably used as or in a rechargeable metal/air depolarized battery and in particular in a zinc/air depolarized battery.

The small-pored separator can be made from polyethylene, polypropylene or polyolefins. The use of grafted versions of these materials increase the wettability by the electrolyte. To prevent dendrite formation during recharging, particular significance is attached to the mechanical stability of the small-pored separator. Furthermore, the small-pored separator should have a very small pore size, accompanied by an adequate permeability for OH ions.

Particularly good results are obtained with polyethylene materials with particularly high molecular weights, namely so-called PE-UHMW. These materials have a particularly good resistance to chemicals and a good electrical insulating capacity. The average pore size for such a material is approximately 0.1 $\mu$m. In this case the porosity is approximately 40%.

The pores of the separator can also advantageously be filled in order to prevent the escape from the separator area of unstable discharge products. Suitable filling materials are in particular salts, which are admittedly insoluble in lyes, but permeable for $OH^-$ ions. $TiO_2$ is given as an example. However, it is also appropriate to use hydroxides or certain oxides, such as MgO or CaC, particularly due to the high permeability thereof for $OH^-$ ions.

The relief or profile structure optionally applied to -the electrode surface can in principle have a random design. Generally use is made of a honeycomb structure, in which the individual, raised island areas are separated from one another by trench-like depressions. A particular aim is a substantially uniform and homogeneous distribution of the islands or segments with separation by depressions in the form of trenches.

The individual islands, segments or raised areas are kept contact-free through corresponding trenches, an electrical contact at the most occurring via the so-called electrode support. The spatial separation by the corresponding trenches can also be assisted by insulating struts, particularly in the vicinity of the large-pored separator. The structure of the islands or segments can be rectangular, particularly square, circular or have any other random shape. It is also possible to provide strip areas, particularly in parallel, which are separated from one another by corresponding strip-like, parallel trenches.

Advantageously the described inventive battery system is used with an in particular alkaline, aqueous electrolyte with a concentration between approximately 3 and approximately 10 mole/l, particularly approximately 6 mole/l.

To improve certain characteristics, such as e.g. the corrosion stability, discharge behaviour, etc., a metal can be added as an additive to the electrode of the battery sys;tem. Use is made of metals, which are anodically oxidizable in the alkaline range and e.g. constituted by Hg, Cd, Ca, Sn, Pb or the like.

In particular, lead (Pb) is added in a concentration of approximately 0.1 to approximately 5 wt. %. On reconstructing a corresponding electrode, i.e. fundamentally renewing, the lead concentration in the electrolyte is between approximately 0.1 and approximately 2 wt. %. Particularly favourable conditions arise with 1 wt. % in the electrode material and approximately 0.2 wt. % during the reconstruction of the electrode in the electrolyte.

During electrochemical regeneration, the metal in the electrolyte to be deposited on the electrode to be regenerated must be set within specific ranges. For example, in the case of zinc electrodes concentrations of approximately 1 to 100 g/l are chosen, preference being given to a concentration of 20 g/l.

BRIEF DESCRIPTION OF THE DRAWINGS

The invention is described in greater detail hereinafter relative to non-limitative, preferred embodiments and the attached drawings, wherein show:

FIG. 2 A perspective, part sectional view of an electrode of the battery system according to the invention in FIG. 1.

FIG. 5A A side view of an electrode of another embodiment of the battery system according Lo the invention.

FIG. 5B A plan view of a section through the electrode of FIG. 5A, relative to plane X.

DETAILED DESCRIPTION OF THE PREFERRED EMBODIMENTS

Figure 1:
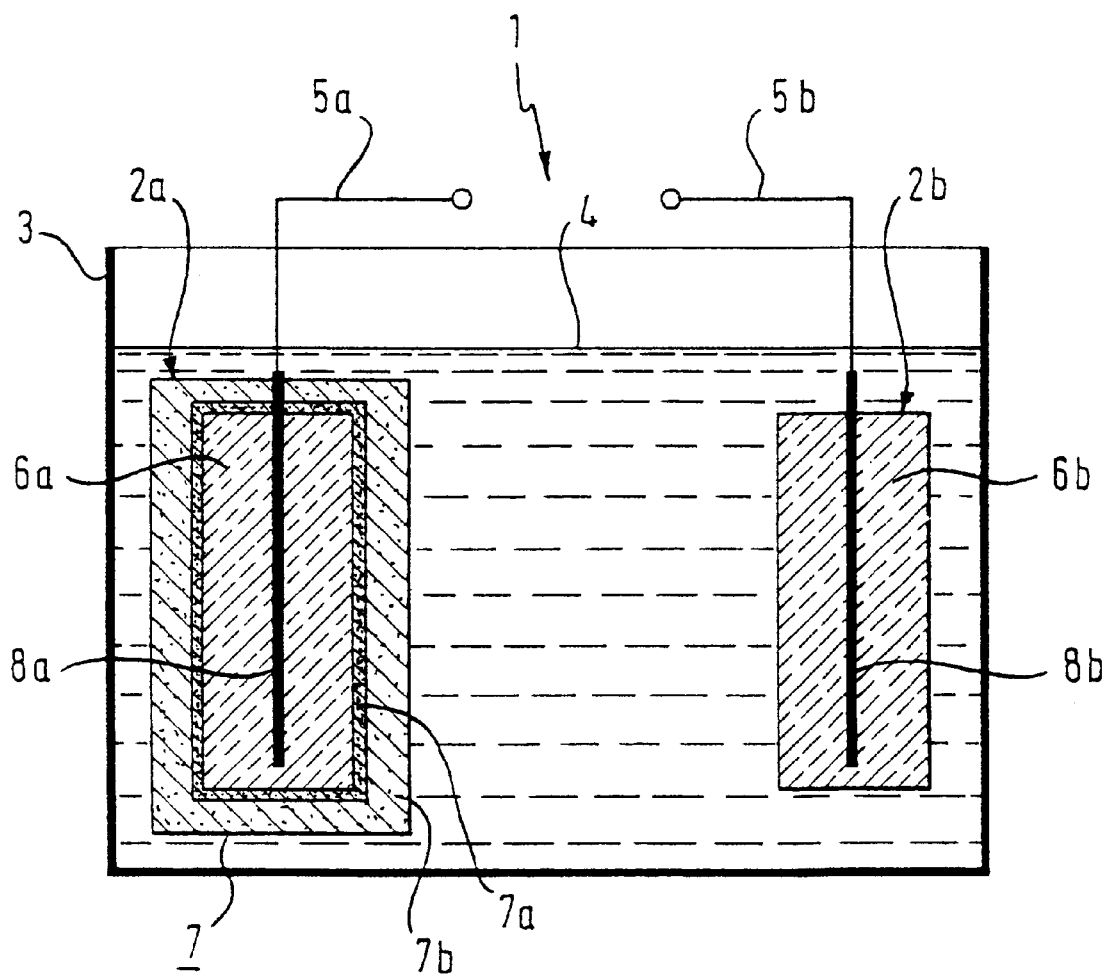
FIG. 1 A diagrammatic, sectional side view of an embodiment of the rechargeable battery system according to the invention.

FIG. 1 is a diagrammatic, part sectional side view of an embodiment of the rechargeable battery system according to the invention.

In general, said battery system 1 is substantially surrounded and enclosed by an electrolyte space 3, which is filled with an electrolyte 4. The electrolyte space 3 can be constructed as a completely closed container or also in a partly open constructional form. In the embodiment shown, the electrolyte space 3 receives two electrodes 2a and 2b, in such a way that they are substantially completely wetted by the electrolyte 4.

The core of the electrodes 2a and 2b is formed by an electrode support 8a or 8b, which is in each case covered by an electromechanically active coating 6a or 6b. The electrodes are tapped by electrical leads or taps 5a or 5b, through which the electrical energy can be transferred to a load or to a consumer.

In the embodiment of the battery system 1 according to the invention shown in FIG. 1 the left-hand electrode 2a is constructed as a substantially insoluble metal electrode of the second type. The support 8a on this electrode can be a random, electrically conductive support. The electrochemically active coating 6a can here be e.g. of zinc. In this embodiment the electrode 2a is connected as an anode.

The electrode 2a is surrounded by a separator arrangement 7, which completely encloses the electrode 2a. The separator arrangement 7 of the embodiment of FIG. 1 has an inner, first, small-pored separator 7a and an outer, second, large-pored separator 7b.

The inner, first, small-pored separator 7a serves to reduce certain concentration gradients in the electrolyte 4 in the vicinity of the electrochemically active coating 6a and therefore reduce that part of the structural and/or shape change of electrode 2a during cyclic discharging and charging which can at least partly be attributed to the electtoosmotically driven convection currents, particularly parallel to the surface of the electrochemically active coating 6a. The small-pored separator 7a can also effectively reduce dendrite formation and therefore the risk of internal short-circuits.

The outer, second, large-pored separator 7b surrounds the interior, namely the actual electrode 2a and the inner separator 7a and is used for mechanically stabilizing the complete electrode 2a and reducing the structural and/or shape changes, particularly the volume increase, of the electrochemically active coating 6a of the electrode 2a, in that the latter is firmly surrounded, so that a volume change is impossible and secondly the sinking of insoluble and in particular mechanically unstable discharge products, particularly from the electrochemically active coating 6a, as a result of gravity is prevented.

FIG. 2 shows in a perspective, part sectional side view in greater detail the electrode 2a of the embodiment of FIG. 1.

The core of the electrode 2a is here formed by a support 8a, which in turn receives the electrochemically active coating 6a, e.g. a zinc coating. In this embodiment, the electrochemically active coating 6a is surrounded by an inner, first, small-pored separator 7a. Towards the out-side, the entire electrode 2a is sealed by an outer, second, large-pored separator 7b. For electrolyte exchange between the exterior of the electrode 2a and the interior, the outer, second, large-pored separator 7b has a plurality of pores, openings or channels 9. These openings have the same circular configuration in the embodiment of FIG. 2 and are arranged regularly in the form of a lattice with only small gaps in the wall of the separator 7b.

Figure 3A:
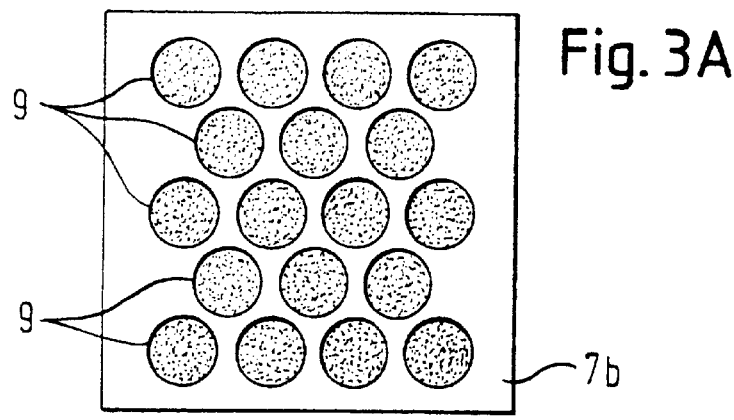
FIGS. 3A, Diagrammatic side views of different embodiments 3B & 3C of a separator of the battery system according to the invention in FIG. 1.
Figure 3B:
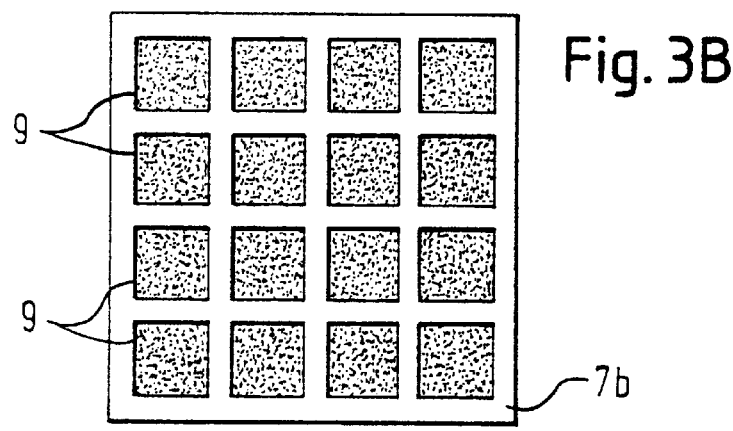
Figure 3C:
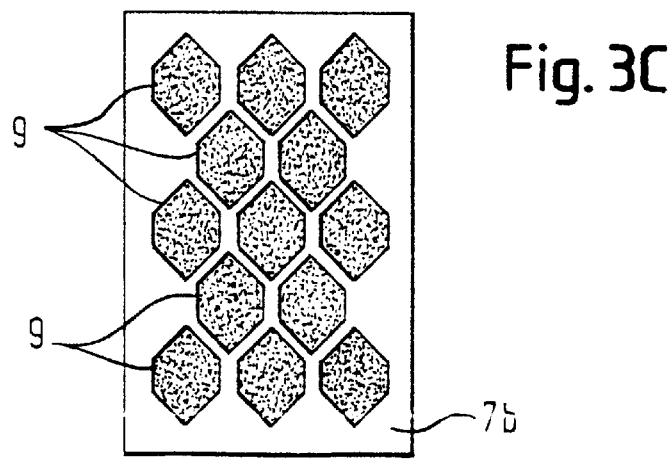

FIGS. 3A, 3B and 3C diagrammatically show side views of different embodiments of large-pored separators 7b. These embodiments differ solely with respect to the shape and reciprocal arrangement of the pores, openings or channels 9 made in the separator wall.

The separator 7b in FIG. 3A has the same circular pores as shown in FIG. 2. Unlike in the embodiment shown in FIG. 2, the said pores are mutually staggered.

The pores of the embodiment of FIG. 3B have a rectangular, particularly square cross-section and, like in the embodiment of FIG. 2, introduced regularly in the form of a lattice in the separator wall.

The pores 9 of the separator 7b shown in FIG. 3C are, like in the embodiment shown in FIG. 3A, staggered and the openings 9 in this case are in the separator wall and have a regular, hexagonal cross-section, roughly with a honeycomb shape.

However, fundamentally any cross-sectional shape can be used for the pores 9. There can also be random pore arrangements in the separator wall, provided that it is ensure that the electrochemically active coating 6a is wetted adequately strongly and uniformly with electrolytes 4, so that there is an adequate and in particular also uniform, electrochemical conversion.

Figure 4A:
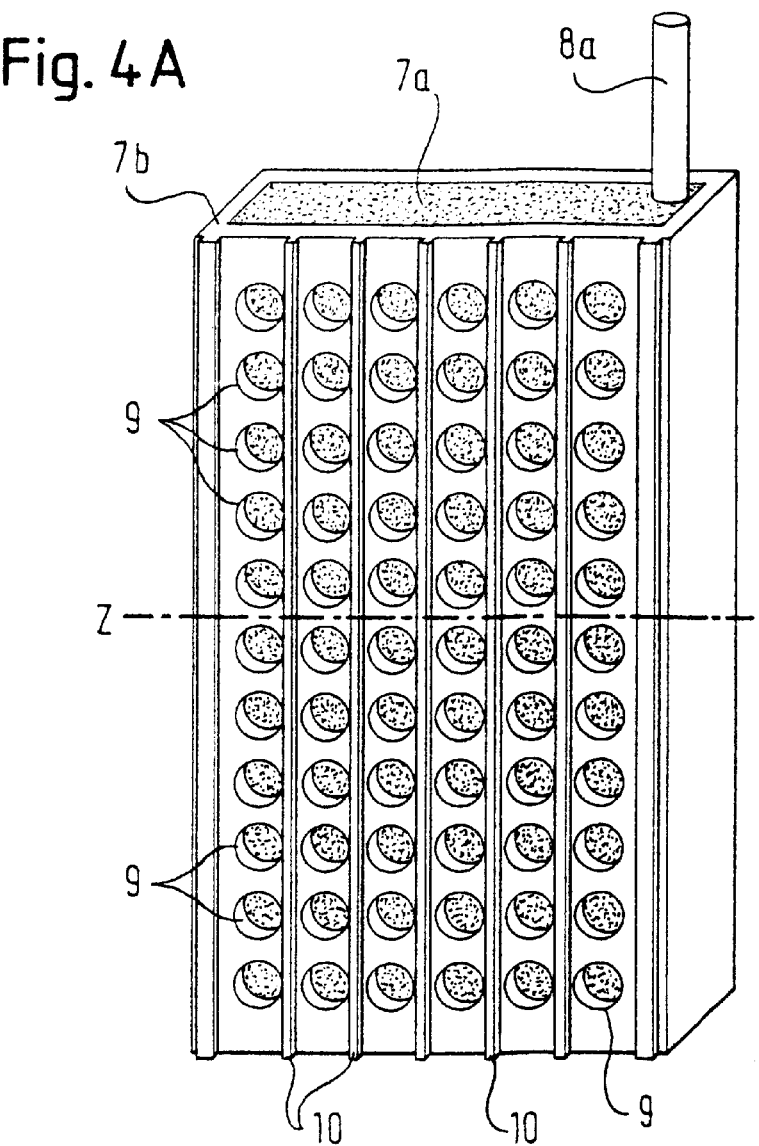
FIG. 4A A perspective, part sectional side view of an electrode in another embodiment of a battery system according to the invention.

FIG. 4A shows in a perspective side view a so-called magazine electrode 2a, in which the second, large-pored separator 7b is constructed in the form of a mechanically reinforced magazine. The pores or openings 9 in this embodiment, like in the separator 7b shown in FIG. 2, are arranged in circular, regular manner in the form of a lattice. The individual columns of the openings 9 have equidistant reinforcing edges 19, which improve the large-pored separator 7b with respect to its bending resistance and volume constancy.

In the embodiment of FIG. 4A, through the openings 9 or edge in the upper area, it is possible to see the inner, first, small-pored separator 7a. It is also possible to see the electrode core in the form of the support 8a.

Figure 4B:
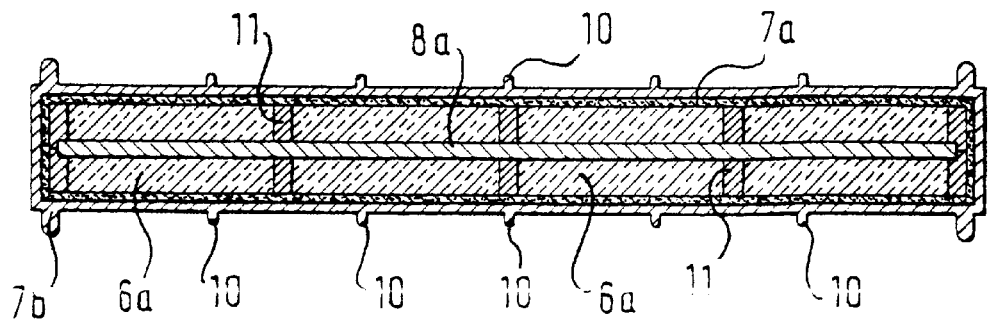
FIG. 4B A plan view of a section of the electrode shown in FIG. 4A, along plane Z.

FIG. 4B is a plan view of a section of the electrode shown in FIG. 4A, with respect to its sectional plane 7. It is also possible to see that the separator arrangement 7 with the outer, large-pored separator 7b and the inner, small-pored separator 7a intimately surrounds the electrode material or the electrochemically active coating 6a (shown in FIG. 4B) and consequently reduces a volume change or a structural and shape modification with respect to said coating 6a. Apart from the already mentioned reinforcing edges 10, the stability in the interior of the separator 7 can be further increased, particularly for the formation of the segmentation of the electrochemically active coating 6a, i.e. for forming the surface profile or relief, webs or beams 11 can be provided, which constitute an additional measure for suppressing a volume increase and shape changes to the electrochemically active coating 6a.

FIG. 5A shows another example of an electrode 2a with a separator arrangement 7. In this case the outer separator 7b has square openings 9, which are roughly congruent with the segments or honeycombs of the profile or relief of the electrochemically acitve coating. There is no inner, small-pored separator 7a in this embodiment. Such a measure is e.g. avoidable with substantially insoluble electrodes, particularly if the segmentation of the electrode surface is adequate for preventing volume or shape changes.

FIG. 5B is a plan view of a section through the electrode of FIG. 5A along sectional plane X. It is clear that there is no small-pored, inner separator 7a. It is also possible to see the electrode core in the form of a support element 8a. For the additional mechanical reinforcement of the outer separator 7b and for surface parquetting into segments 12, webs 11 are provided.

The additional elements 10, 11 for increasing the mechanical stability of the outer separators 7b shown in FIGS. 4A to 5B can also be constructed in one form, so that the pores 9 of the large-pored separators 7b, together with the mechanical reinforcing webs 11 essentially form closed chambers, which are electrically interconnected by means solely of the electrode core 8a, but are otherwise and in particular from the flow standpoint insulated from one another. Such a measure, i.e. the subdivision of the complete electrode surface into a plurality of small portions, also prevents a sinking of mechanically unstable discharge products and therefore also a considerable part of the structural and shape changes occurring during cyclic charging and discharging, particularly with respect to the electrochemically active coating 6a.

Figure 6A:
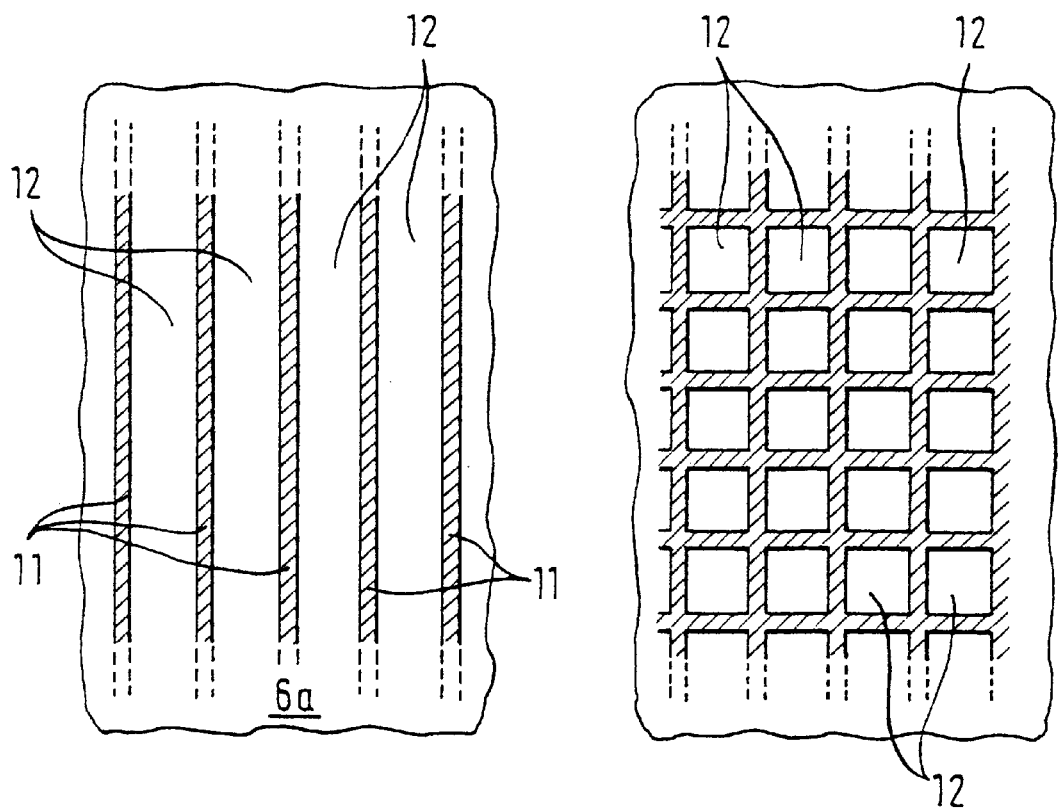
FIG. 6A A plan view of the surface profile or relief of an electrode of the apparatus according to the invention.

FIG. 6A shows two plan views of the surface profiles or reliefs of an electrode of a battery system according to the invention. On the left-hand side are provided the surface segments 12 of the electrochemically active coating 6a in strip form and are separated from one another by parallel depressions 11. Both the segments 12 and the separating depressions 11 can be parallel to one another and have substantially the same arrangement and dimensions.

On the right-hand side of FIG. 6A is provided the parquetting 12 of the electrochemically active coating 6a of the electrode in the form of a pattern with square segments 12, which are arranged in latticed manner and separated from one another by a corresponding lattice with depressions 11.

Figure 6B:
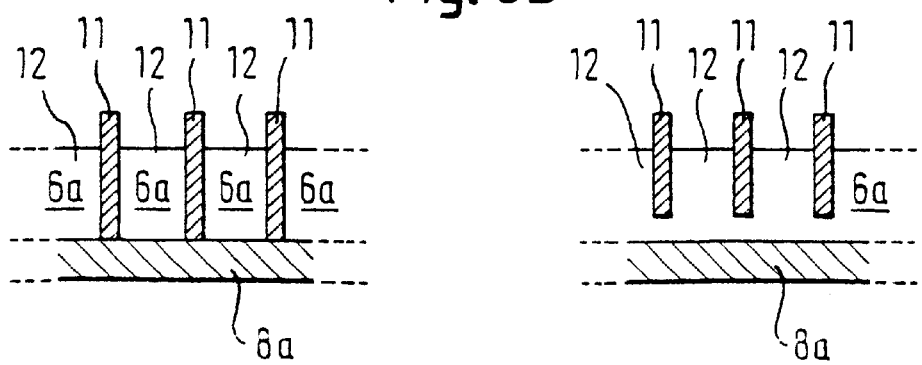
FIG. 6B A cross-sectional view of the surface profile or relief of an electrode of the battery system according to the invention.

FIG. 6B shows corresponding surface profiles or reliefs in cross-section. The individual segments 12 of the electrochemically active coatings 6a can be completely spatially separated from one another, the spatial separation through the depressions 11 being further reinforced by corresponding crossbars both with regards to a mechanical stabilization and with regards to a substantial electrical insulation.

On the right-hand side of FIG. 6B, it is shown that the segments 12 of the electrochemically active coating 6a can be at least in galvanic contact with one another on the base thereof, the depressions 11, which essentially have a separating function here, also being fillable by corresponding crossbars.

In certain cases high demands may be made on the materials used for the separator arrangement 7 or the second, large-pored separator 7b with regards to the chemical inertness, mechanical stability and/or thermal stability and extension.

In principle, all nonconductive materials or material combinations can be used, which are substantially chemically inert under operating and recharging conditions. Thus, it is e.g. possible to use organic plastics, particularly organic polymers, such as e.g. Teflon, or combinations thereof. Consideration can also be given to inorganic materials, such as e.g. inorganic polymers, sintered materials, ceramics or glasses.

It is also possible to use materials, which either satisfy the inertness requirements to an only inadequate extent or which e.g. conduct the electric current, provided that these materials are only used as supports for the separator and are coated with a corresponding inert and electrically nonconducting material. Thus, e.g. consideration can be given to the use of metal nets or lattices, which are coated with a Teflon coating.

Within the context of the invention, the term insoluble electrode is understood to mean an electrode in which the electrochemically active coating under the operating conditions of the battery system is insoluble or only slightly soluble in the electrolyte and where the discharge products which may arise during the discharge of the electrode configuration are also not soluble or only difficultly soluble in the electrolyte.

Thus, from the material standpoint, an insoluble electrode substantially does not participate in the oxidation and reduction processes occurring at the electrode configuration. They serve merely as an electron acceptor or donor. Therefore the material forming the electrochemically active coating essentially does not leave the latter, but through corresponding oxidation or reduction processes can be chemically transformed to discharge products.

The term soluble electrode is used if the electrode material dissolves without significant retarding whilst giving off or absorbing electrons.

The term electrode of the second type in the sense of the invention is understood to mean an electrode, in which, in the charging/discharging process at the electrode, participates a difficultly soluble compound of the material of the electrochemically active coating in addition to the material of the electrochemically active coating of the electrode and the dissolved ions. In the case of a metal electrode, this can e.g. be a salt of the particular metal difficultly soluble in the electrolyte. Examples of electrodes of the second type, apart from the aforementioned zinc electrode, are so-called calomel electrodes and silver/silver halide electrodes.

An electrode of the second type is consequently an electrochemical halfcell, whose potential over the solubility product of a difficultly soluble substance is dependent on the activity of an ion type not participating in the electrode reaction.

Besides the so-called zinc electrode of a zinc/air depolarized battery, the method and apparatus according to the invention can naturally also be applied to electrodes of Sn/Pb, Sn/SnO$_2$, Ag/Zn, Ni/Cd, Ni/metal hydride accumulators or batteries or the like.

What is claimed is:

1. Rechargeable battery system comprising:
   at least two electrodes in an electrolyte space filled with electrolyte and which is tapped with the aid of an electrical tap, in which one of the electrodes is constructed as a substantially insoluble electrode of the second type and the electrode of the second type has a separator arrangement surrounding on all sides of the electrode;
   wherein the separator arrangement has at least one small-pored separator and at least one large-pored separator.

2. Battery system according to claim 1, wherein at least the electrode of the second type is additionally provided with an electrochemically active coating having a surface profile with a plurality of depressions.

3. Battery system according to claim 1, wherein at least the electrode of the second type is additionally provided with an electrochemically active coating having a surface profile with a plurality of elevations.

4. Battery system according to claim 1, wherein at least the electrode of the second type is additionally provided with an electrochemically active coating having a surface profile with a plurality of depressions and elevations.

5. Battery system according to claim 1, wherein the electrode of the second type is constructed as an anode.

6. Battery system according to claim 1, wherein the electrode of the second type is constructed as a metal electrode.

7. Battery system according to claim 1, wherein the electrode of the second type is constructed as a zinc electrode.

8. Battery system according to claim 1, wherein the small-pored separator is constructed for preventing the escape of discharge, products of the electrode of the second type from the separator arrangement and preventing short-circuits particularly by dendrite formation during electrical recharging.

9. Battery system according to claim 1, wherein the large-pored separator is constructed for firmly surrounding the electrode of the second type.

10. Battery system according to claim 1, wherein the large-pored separator has a mechanical stability, which in particular counteracts a volume increase of the electrode of the second type and a structural and shape change during charging and/or discharging of the battery system.

11. Battery system according to claim 1, wherein the large-pored separator has means for the supply and discharge of electrolyte with respect to the electrode.

12. Battery system according to claim 11, wherein the supply and discharge means have substantially the same shape and are roughly homogeneously distributed on the large-pored separator.

13. Battery system according to claim 11, wherein the supply and discharge means are arranged in honeycomb form on the separator and in particular have a circular, rectangular or hexagonal cross-section.

14. Battery system according to claim 11, wherein the supply and discharge means comprises a plurality of pores.

15. Battery system according to claim 11, wherein the supply and discharge means comprises a plurality of openings.

16. Battery system according to claim 11, wherein the supply and discharge means comprises a plurality of channels.

17. Battery system according to claim 1, wherein at least the large-pored separator of the separator arrangement is made from an electrically nonconductive material.

18. Battery system according to claim 1, wherein the separator arrangement is chemically inert with respect to at least one of oxygen, concentrated lyes, acids, and added electrolyte additives.

19. Battery system according to claim 1, wherein the separator arrangement is chemically inert with respect to at least one of oxygen, KOH, acids, and added electrolyte additives.

20. Battery system according to claim 18, wherein the added electrolyte additives are chosen from the group consisting of Pb, Hg, Cd, Ca, and Sn.

21. Battery system according to claim 1, wherein at least the large-pored separator of the separator arrangement is chemically stable with respect to temperatures up to 100° C.

22. Battery system according to claim 1, wherein the separator arrangement and in particular the large-pored separator has a low thermal expansion coefficient in the operating temperature range.

* * * * *